United States Patent [19]

Klein et al.

[11] Patent Number: 4,788,538

[45] Date of Patent: Nov. 29, 1988

[54] METHOD AND APPARATUS FOR DETERMINING BOUNDARIES OF GRAPHIC REGIONS

[75] Inventors: Stephen A. Klein; David A. Rolfe, both of Pasadena; William T. Gross, La Canada; Lawrence S. Gross, Santa Monica, all of Calif.

[73] Assignee: Lotus Development Corporation, Cambridge, Mass.

[21] Appl. No.: 42,161

[22] Filed: Apr. 24, 1987

Related U.S. Application Data

[63] Continuation-in-part of Ser. No. 931,678, Nov. 17, 1986, abandoned.

[51] Int. Cl.[4] ............................................. G09G 1/14
[52] U.S. Cl. ................................... 340/747; 340/744; 340/728; 340/709
[58] Field of Search ............... 340/703, 706, 709, 710, 340/723, 728, 747, 789

[56] References Cited

U.S. PATENT DOCUMENTS

| | | | |
|---|---|---|---|
| 4,368,463 | 1/1983 | Quilliam | 340/744 |
| 4,626,838 | 12/1986 | Tsujioka et al. | 340/728 |
| 4,646,078 | 2/1987 | Knierim et al. | 340/747 |
| 4,698,625 | 10/1987 | McCaskill et al. | 340/709 |

*Primary Examiner*—Gerald L. Brigance
*Attorney, Agent, or Firm*—Blakely Sokoloff Taylor & Zafman

[57] ABSTRACT

The present invention provides apparatus and methods for determining the boundaries of arbitrarily shaped regions on a computer display system having a central processing unit (CPU). The CPU is coupled to a display having a plurality of selectively enabled and disabled display elements arranged in a matrix, whereby each display element is identified by a unique X,Y address. A memory coupled to the CPU includes a plurality of memory cells, wherein the cells correspond to a display element on the display. An initial X,Y address is selected on the display by a user employing a cursor control to identify an area on the display where the boundaries of a region are to be determined. The initial X,Y address selected by the user is defined as a seed cell. The CPU determines if the initial seed cell corresponds to a disabled memory cell and blank (disabled) display element, and in such event increments the initial X,Y address to search outwardly a predetermined maximum distance to adjacent memory cells until an enabled (non-blank) cell is located. This enabled cell is set as a new seed cell. The CPU then searches radially outward in M directions from the new seed cells X,Y address for N consecutive disabled (blank) memory cells and sets in each of these directions the last non-blank (enabled) memory cell prior to the N consecutive disabled cells, as boundary cells. An initial rectangular region is defined through at least two of these boundary cells, and the CPU determines if P consecutive rows and columns of blank (disabled) memory cells bound the initial rectangular region. If not, the CPU selectively extends the boundaries of the initial rectangular region in X and Y directions until the region is bounded by P consecutive rows and columns of disabled cells. Accordingly, the boundaries of a region on a display are determined.

35 Claims, 7 Drawing Sheets

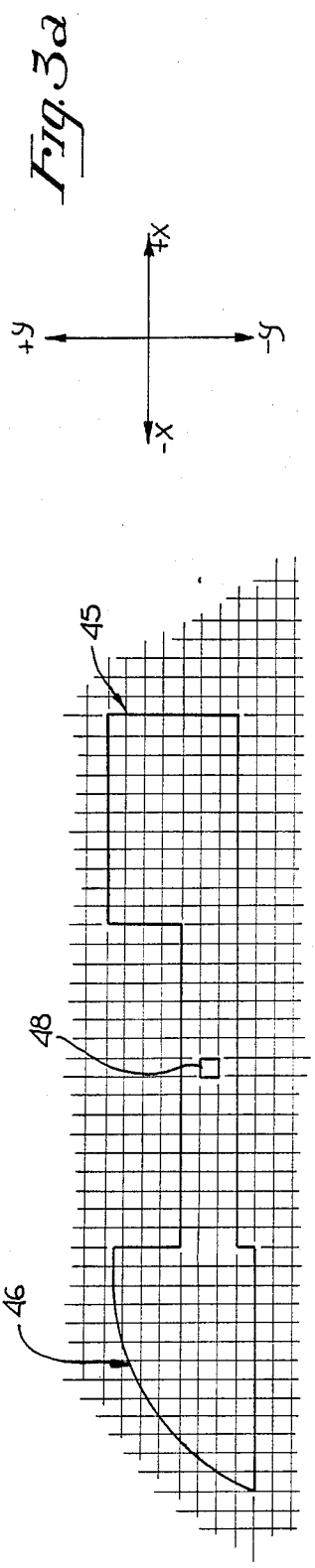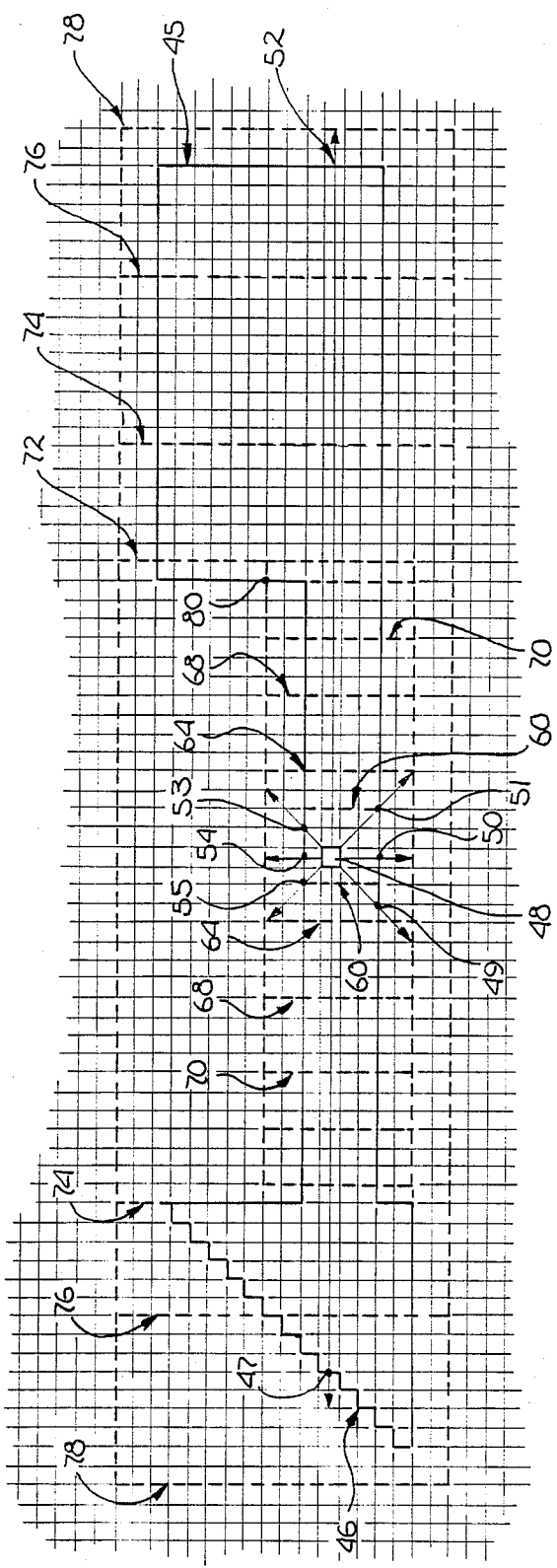

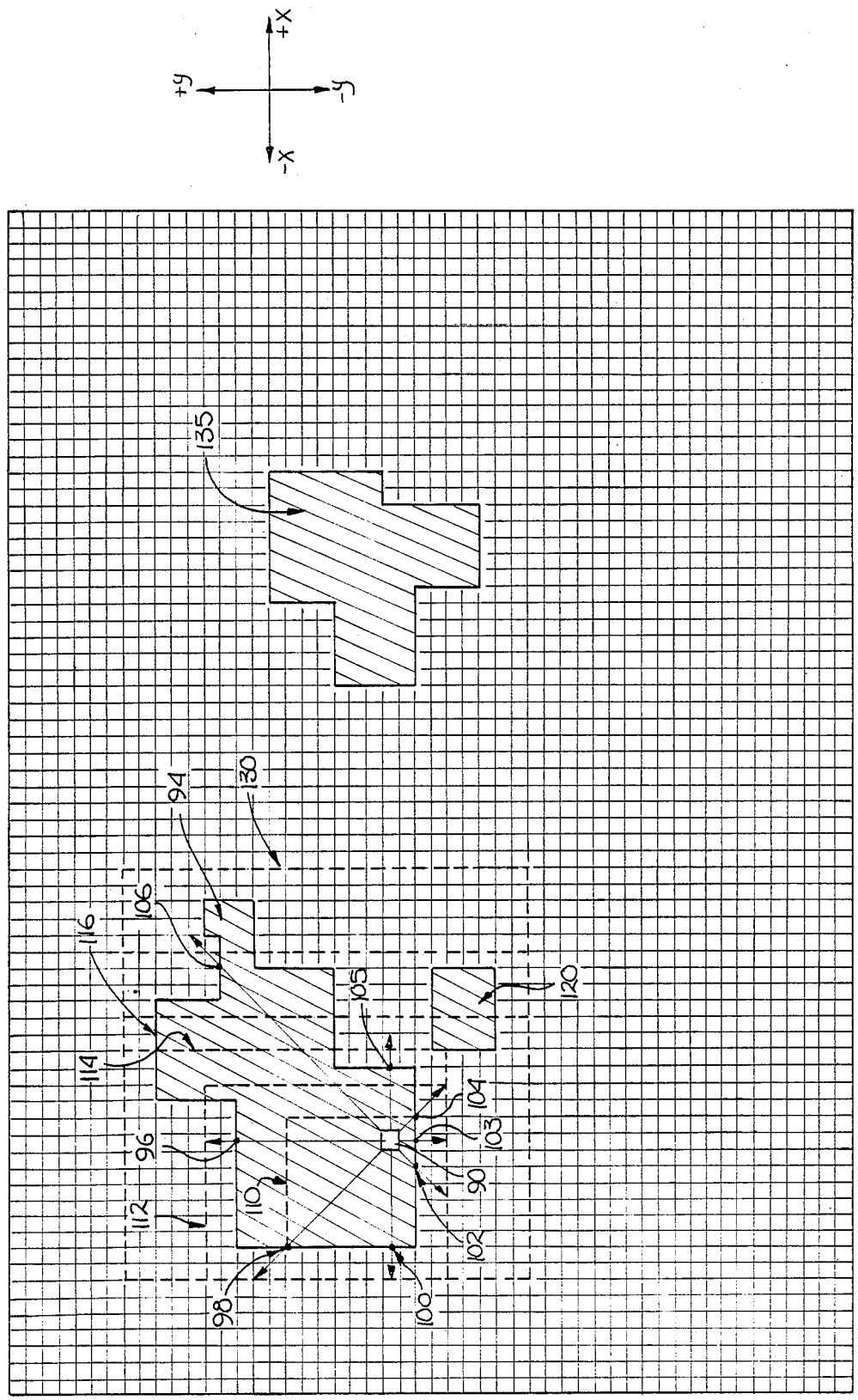

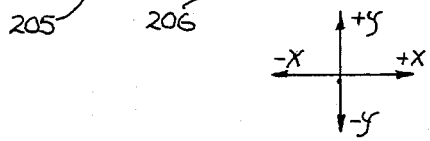

METHOD AND APPARATUS FOR DETERMINING BOUNDARIES OF GRAPHIC REGIONS

BACKGROUND OF THE INVENTION

This Application is a continuation-in-part of U.S. patent application, Ser. No. 06/931,678, filed Nov. 17, 1986, and assigned to the Assignee of the present Application now abandoned.

FIELD OF THE INVENTION

The present invention relates to apparatus and methods for determining the boundaries of regions, and more particularly, to data processing apparatus and methods for determining the boundaries of regions on a computer display system.

ART BACKGROUND

It is common in computer systems to represent and convey information to a user through graphic representations. These representations may take a variety of forms, such as for example, alphanumeric characters, cartesian or other coordinate graphs, spread sheets, as well as shapes of physical objects on a display screen. Historically, humans have interfaced with computers through a system of discrete commands which typically comprise a combination of both text and mathematical symbolic characters. However, the ease with which a user becomes proficient in programming or interacting with a computer is generally a function of how close the system models the logical thought of the user himself. In recent years, systems have been developed to minimize the learning and acclimation period which a user must go through in order to become proficient in the interaction with the computer system. These so-called "object oriented" or "small talk" systems replace many common coded programming commands with two-dimensional graphics and animation on a computer display.

It has been found that a person can absorb and manipulate information presented in a visual context much faster than if represented merely by text. One common small talk interface approach utilizes multiple "windows" displayed on a cathode ray tube (CRT) used for display in which combination of text and graphics are used to convey information. See, for example, D. Robson, "Object Oriented Software Systems", Byte, August 1981, pg. 74, Vol. 6, No. 8.

In some instances, such as when using a "spread sheet" program, data is represented by alphanumeric characters stored in a multiplicity of "cells" identified by a row and column address on the display screen. The manipulation of data disposed in a spread sheet typically requires the user to enter a variety of complex commands in order to perform operations on data disposed in selected cells. The requirement that the user enter complex commands into the computer system to manipulate the spread sheet data renders operation of the data processing system by the user more difficult, and slows learning time before the user becomes proficient in the particular command structure of the program.

In order to avoid the necessity of the user learning numerous commands to manipulate data in a computer system, so called "context oriented" programming languages have been developed. An example of a typical request in a context oriented language would be "ERASE THIS". The computer system must determine what "THIS" refers to in the context of the application at hand. Other, similar commands, would be "ERASE THIS ROW", or "GRAPH JANUARY TO MARCH". The data processing system must determine the context and range of the user's command prior to being able to execute the command. Outside of the environment of a "spread sheet", context sensitive systems may involve the use of graphic representations of arbitrary regions on a display screen. The data processing system must determine which region the user is referring to prior to execution of the desired command. Accordingly, one of the first operations the data processing system must complete is the determination of the boundaries of the region, or, in the case of a spread sheet, the region boundaries in terms of rows and columns, which define the region which the user wants to operate upon. Although to the user the data processing system may appear to have innate intelligence in being able to determine the context and region the user is referring to, in reality the data processing system must follow discrete and identifiable sequences of operations to achieve the desired result.

As will be disclosed below, the present invention provides apparatus and methods whereby the boundaries of any arbitrarily shaped region may be defined, to permit a data processing system to determine the context of a command and proceed with its execution on the desired region.

SUMMARY OF THE INVENTION

The present invention provides apparatus and methods for determining the boundaries of arbitrarily shaped regions on a computer display system having a central processing unit (CPU). The CPU is coupled to a display having a plurality of selectively enabled and disabled display elements arranged in a matrix, whereby each display element is identified by a unique X,Y address. A memory coupled to the CPU includes a plurality of memory cells, wherein the cells correspond to a display element on the display. Data disposed in the memory cells define regions on the display which may comprise alphanumeric characters, images and the like. An initial X,Y address is selected on the display by a user employing a cursor control to identify an area on the display where the boundaries of a region are to be determined. The initial X,Y address selected by the user is defined as a "seed" cell. The CPU determines if the initial seed cell corresponds to a disabled (blank) display element, and in such event, increments the initial X,Y address to search outwardly a predetermined maximum distance to adjacent memory cells until an enabled (non-blank) display element is located. This enabled cell is set as a new seed cell. The CPU then searches radially outward in M directions from the new seed cell's X,Y address for N consecutive disabled (blank) memory cells, and sets in each of these directions the last non-blank (enabled) memory cell prior to the N consecutive disabled cells, as boundary cells. An initial rectangular region is defined through at least two of these boundary cells, and the CPU determines if P consecutive rows and columns of blank (disabled) memory cells bound the initial rectangular region. If not, the CPU selectively extends the boundaries of the initial rectangular region in X and Y directions until the region is bounded by P consecutive rows and columns of disabled cells. Accordingly, the boundaries of a region on a display are determined. An alternate embodiment is disclosed, in which the initial rectangle is defined through two points having maximum and minimum values, respectively of the boundary cells. The present invention further discloses apparatus and methods for implementing the teachings of the present invention in a spread sheet display environment.

BRIEF DESCRIPTION OF THE DRAWINGS

FIG. 1 illustrates a computer system incorporating the teachings of the present invention.

FIGS. 3a and 3b illustrate the present invention's method for defining the boundaries of a region around a contiguous object.

FIG. 4 illustrates the present invention's method of defining the boundaries of a region wherein multiple non-contiguous regions are displayed.

FIG. 6 illustrates the use of the present invention in the spread sheet environment.

FIG. 7 further illustrates the use of the present invention in a spread sheet environment to determine the boundaries of regions.

FIG. 8 sets forth a further example of the use of the present invention in defining region boundaries in a spread sheet environment.

NOTATION AND NOMENCLATURE

Figure 2:
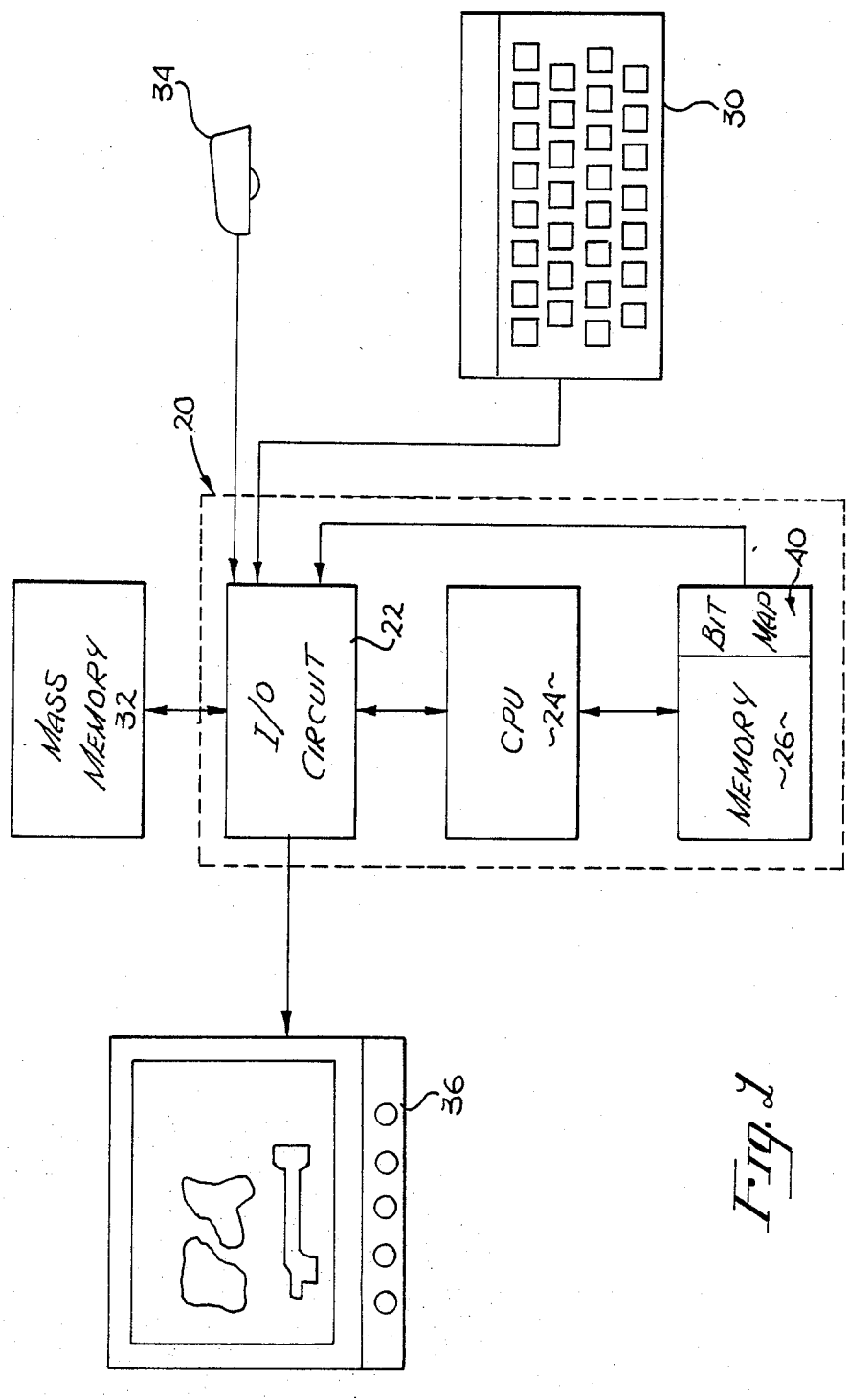
FIG. 2 is a flow chart illustrating the sequence of operations executed by the computer system of FIG. 1, to determine the boundaries of an arbitrarily shaped region.
Figure 2:
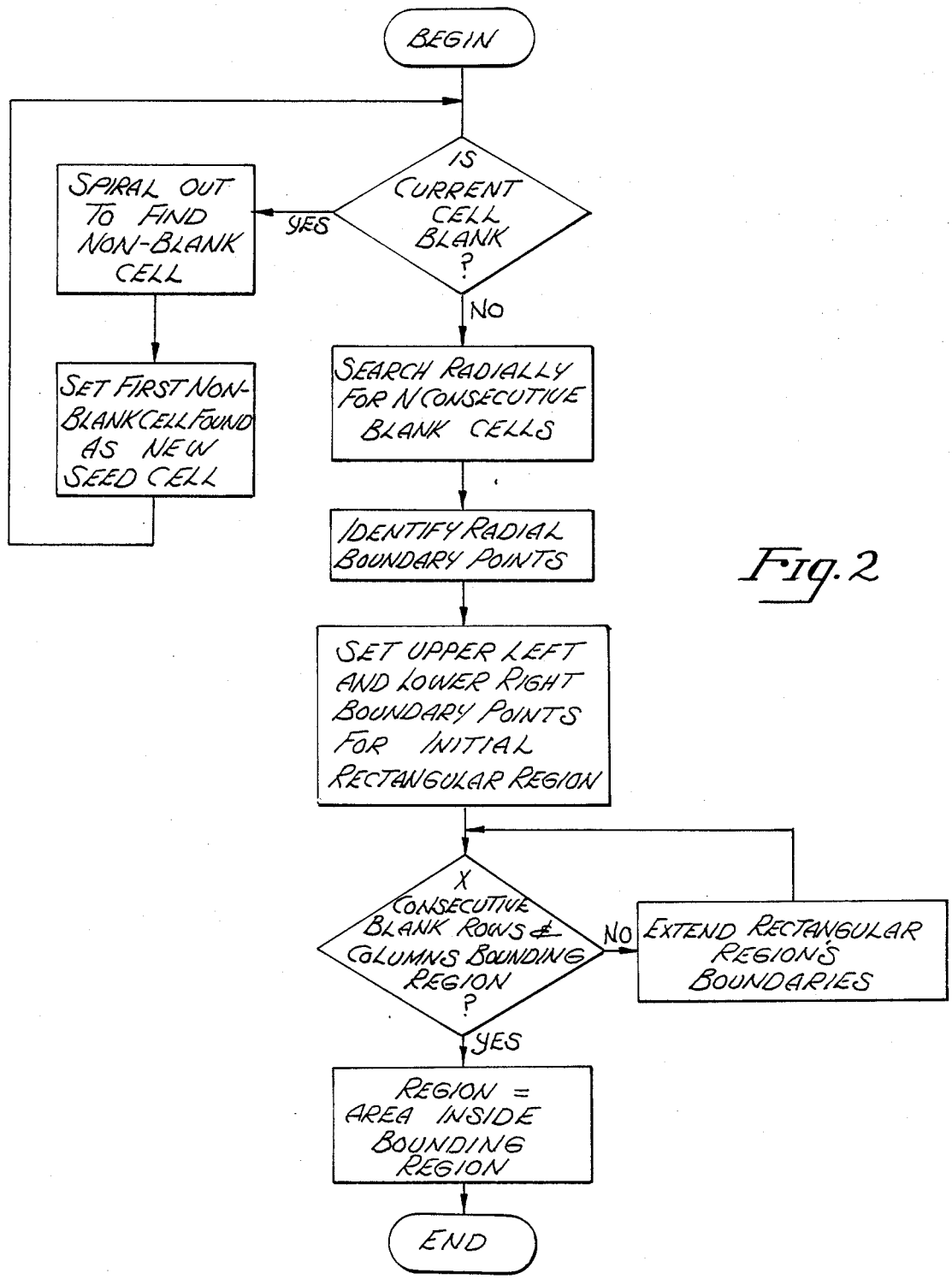

The detailed description which follows is presented largely in terms of algorithms and symbolic representations of operations on data bits within a computer memory. These algorithmic descriptions and representations are the means used by those skilled in data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, memory cells, display elements, or the like. It should be kept in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, the distinction between the method operations in operating a computer and the method of computation itself should be noted. The present invention relates to method steps for operating a computer and processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other apparatus. In particular, various general purpose machines may be used with the teaching herein, or it may prove more convenient to construct more specialized apparatus to perform the required method steps. The required structure for a variety of these machines will be apparent from the description given below.

CODING DETAILS

No particular programming language has been indicated for carrying out the various procedures described herein. This is in part due to the fact that not all languages that might be mentioned are universally available. Each user of a particular computer will be aware of a language which is most suitable for his immediate purposes. In practice, it has proven useful to substantially implement the present invention in an assembly language which provides a machine executable object code. Because the computers and the monitor systems which may be used in practicing the instant invention consist of many diverse elements, no detailed program listing has been provided. It is considered that the operations and other procedures described herein and illustrated in the accompanying drawings are sufficiently disclosed to permit one of ordinary skill to practice the instant invention, or so much of it as is of use to him.

DETAILED DESCRIPTION OF THE INVENTION

The following detailed description is divided into several sections. The first of these discloses a general system arrangement for storing, retrieving, and manipulating data. Subsequent sections deal with apparatus and methods for determining the boundaries of arbitrarily shaped regions on a display screen stored in a computer memory and displayed on a display screen.

In addition, in the following description, numerous details are set forth such as algorithmic conventions, specific bits, memory cells, pixels, etc., in order to provide a thorough understanding of the present invention. However, it will be apparent to one skilled in the art that the present invention may be practised without these specific details. In other instances, well known circuits and structures are not described in detail in order not to obscure the present invention unnecessarily.

GENERAL SYSTEM CONFIGURATION

FIG. 1 illustrates a typical computer based system for generating computer graphic images according to the present invention. Shown there is a computer 20 which comprises three major components. The first of these is the input/output (I/O) circuit 22 which is used to communicate information in appropriately structured form to and from the other parts of computer 20. Also shown as part of computer 20 is the central processing unit (CPU) 24 and memory 26. These latter two elements are those typically found in most general purpose computers and almost all special purpose computers. In fact, the several elements contained within computer 20 are intended to be representative of this broad category of data processors. Particular examples of suitable data processors to fill the role of computer 20 include machines manufactured by Apple Computer, Inc., and International Business Machines (IBM). Other computers having like capabilities may be adapted in a straight forward manner to perform the several functions described below.

Also shown in FIG. 1 is an input device 30 shown in a typical embodiment as a keyboard. It should be understood, however, that the input device may actually be a card reader, magnetic or paper tape reader, or other well known input device (including, of course, another computer). A mass memory device 32 coupled to the I/O circuit 22 provides additional storage capability for the computer 20. The mass memory 32 may include other programs and the like and may take the form of a magnetic or paper tape reader, hard disk drive, compact laser disk, or other well known mass storage device. It will be appreciated that the data retained within mass memory 32, may, in appropriate cases, be incorporated in standard fashion into computer 20 as part of the memory 26.

In addition, a "mouse" input device 34 is illustrated which permits the user to input graphic information to computer 20 through I/O circuit 22, in a well known manner. Generally, mouse 34 provides cursor control to identify and position a cursor on a display screen. A cathode ray tube (CRT) 36 is illustrated which is used to display the images being generated by the present invention. Such a display monitor may take the form of any of several well known varieties of CRT displays.

In the present invention, memory 26 includes a "bit map" 40 which represents the video memory for CRT 36. Each bit (or groups of bits) in the bit map 40 within memory 26 corresponds to a display element on CRT 36. Thus, the bit map can be described by a two dimensional array of points having known X, Y coordinates. The display elements comprising the display of CRT 36 may be selectively enabled, or disabled, as a function of whether or not the corresponding memory bit within the bit map of memory 26 is "on" or "off". The use of bit maps to display images on a CRT is well known, and will not be further described in detail in this Specification.

DEFINING BOUNDARIES

Referring now to FIGS. 3a and 3b, it will be appreciated by one skilled in the art that the display of CRT 36 comprises a plurality of display elements ("pixels") which are selectively enabled, or disabled, in order to define desired images on CRT 36. The display elements are organized such that they fall along scan lines whereby each display element may be identified by a unique X,Y coordinate on the two dimensional display of CRT 36. Bit map 40 disposed in memory 26 of the computer 20 includes a plurality of memory cells in which binary quantities may be stored. In practice, each pixel (display element) of CRT 26 is given a corresponding memory cell (or group of memory cells) which determine, in accordance with the contents of the cell, whether or not the display element is enabled or disabled at any particular time. In many systems, whether or not a particular display element is enabled or disabled is dependent upon whether or not a logical "1" or "0" is disposed within the corresponding memory cell. It is in this manner, that the computer 20 may generate and display images on CRT 36. Accordingly, both CRT 36 and bit map 40 in memory 26 may be conceptually considered as a grid in which each cell corresponds to a display element on the CRT 36.

Referring to FIG. 3a, an object is represented by a region generally denoted by the numeral 45, which is stored within bit map 40 of the memory 26, and correspondingly displayed on CRT 36. Region 45 includes what appears to be a curved portion 46, but, upon close examination, the curved region 46 is actually defined by a plurality of enabled display elements along a diagonal, as shown in FIG. 3b. The representation of a curved region on a display screen in this manner is well known in the art, and will not be described further in this Specification.

Assume, for sake of example, that a user desires to move, or modify, region 45 as displayed on CRT 36. As previously discussed, in a context oriented programming environment, such a command could take the form of "MOVE THIS", and computer 20 would then be required to determine the boundaries of region 45 prior to execution of the command. In the presently preferred embodiment, the user moves a cursor into some portion of the region for which boundaries are to be determined, using for example mouse 34, and then issues the context command. In FIG. 3a, a cursor 48 is illustrated generally at the midpoint of region 45, however, cursor 48 may be positioned anywhere within X consecutive rows or columns bounding region 45 with the same result.

Referring now to FIGS. 2 and 3b, the sequence of operations utilized by computer 20 to determine the boundaries of region 45 are disclosed. Computer 20 first determines whether or not cursor 48 is disposed over a "blank" cell, wherein the reference to "blank" simply indicates that the contents of the memory cell within bit map 40 correspond to a disabled condition for the corresponding display element on CRT 36. In the example of FIG. 3a, cursor 48 is disposed over a non-blank (enabled) display element and memory cell. The determination of whether or not the current cell, referred to a a "seed" cell, is blank is accomplished using well known logic circuitry coupled to CPU 24, in conjunction with additional programming operations stored within memory 26. CPU 24 next examines bit map 40 and searches radially outward from cursor 48 for a predetermined number (N) of blank cells in each direction. In the presently preferred embodiment, N is equal to two consecutive blank cells (corresponding to disabled display elements on CRT 36). Radial boundary points are defined as the last enabled cells located along the radial search lines prior to encountering the two consecutive blank disabled cells. As shown in FIG. 3b, the search of CPU 24 in the eight radial directions results in boundary points identified as 47, 49, 50, 51, 52, 53, 54, and 55. Once the initial boundary cells have been identified, CPU 24 next defines an initial rectangular region through at least two of the identified boundary cells. In the presently preferred embodiment, the upper left and lower right boundary cells are used to define the initial rectangular region. The initial rectangular region in the example of FIG. 3b is identified by the numeral 60, and is shown in phantom lines. Once the initial rectangular region has been defined, CPU 24 determines if a predetermined number of consecutive blank (disabled) rows and columns bound the initial rectangular region. As previously stated, two consecutive blank rows and columns must bound the region. In the example of FIG. 3b, two consecutive rows of blank cells do bound the area above boundary cell 55 and cell 51, however, there are not two consecutive columns of blank cells surrounding the entire initial rectangular region.

Accordingly, CPU 24 extends the boundaries of the initial rectangular region in both X and Y directions until the region is bounded by the predetermined number of rows and columns of blank (disabled) cells. For purposes of illustration, in the example of FIG. 3b, consecutively defined rectangles defined by CPU 24 are identified as rectangles 64, 68, and 70. It will be noted that the boundaries of the rectangular region were extended by CPU 24 only in the X direction, and not the Y direction, inasmuch as two consecutive rows of blank cells bounded the regions being defined. However, as the boundaries of the rectangular regions were expanded in the X direction, non-blank (enabled) cells were detected by CPU 24 in the Y direction (at point 80 of FIG. 3b) such that no longer did two consecutive blank rows bound the defined rectangle. Accordingly, CPU 24 extended the boundaries of the last rectangular region such that two consecutive rows of blank cells existed around the region. This rectangle is identified by the numeral 72. It will be noted that once CPU 24 detected point 80, it was only necessary to extend the boundaries of the rectangular region in the positive Y direction and not the negative Y direction, inasmuch as two consecutive rows continue to bound the region in the negative Y direction.

CPU 24 then begins extending the boundaries of the rectangular region 72 in the plus and minus X directions inasmuch as two consecutive blank columns do not yet bound region 45. The CPU 24 systematically extends the boundaries of the rectangular region 72 to define rectangles 74, 76 and 78. Rectangle 78 finally satisfies the condition of a predetermined number of blank (disabled) rows and columns bounding region 45. Accordingly, computer 20 may now execute the desired operation on region 45, since it has now determined that "THIS" in the context oriented command refers to the region within rectangle 78.

Although the above example with reference to FIG. 3b utilized variable parameters such as N (two consecutive blank cells) in the radial search to define the initial rectangular region, as well as the requirement that two consecutive blank rows and columns to bound the subject region, it will be appreciated by one skilled in the art that these are variables may take on a variety of values depending upon the desired application. However, for purposes of clarity, the present invention is described in accordance with the value for such variables as used in the presently preferred embodiment.

Referring now to FIG. 4, non-contiguous arbitrary areas are illustrated as viewed on CRT 36, and represented in bit map 40 of memory 26. As in the case of FIG. 3b, for purposes of this Specification, each square grid cell represents a display element on CRT 36 and memory location in bit map 40. Assume for sake of example that a user enters a command which requires the determination of the boundaries of a region identified by the location of cursor 90. As illustrated in FIG. 4, cursor 90 is situated within an area identified generally by the numeral 94. Using the methods and apparatus described with reference to FIGS. 1, 2 and 3, above, CPU 24 determines that cursor 90 is disposed over a non-blank (enabled) cell and initiates a radial search in eight directions to identify radial boundary cells 96 through 106, as shown in FIG. 4. Using the conventions of the presently preferred embodiment, the upper left and lower right boundary cells (namely cells 98 and 104) are used to define an initial rectangular region identified by the number 110. CPU 24 next determines if initial rectangular region 110 is bounded by two consecutive blank (disabled) rows and columns, and determines that rectangular region 110 is not so bound.

CPU 24 selectively and incrementally extends the boundaries of the rectangular region to define rectangles 112 and 114. It will be noted that the extension of rectangle 114 to rectangle 116 results in the detection of a second area of non-blank cells identified by the numeral 120. Inasmuch as area 120 falls within two consecutive rows and columns of area 94, CPU considers area 120 as falling within the same region as that of area 94. Accordingly, the boundary of the rectangular regions are extended until the condition of two consecutive blank rows and columns surround both areas 94 and 120. It will be apparent to one skilled in the art, that the final region identified by the bounding rectangle 130 does not include an area 135 which is disposed more than the predetermined number of rows and columns of blank cells surrounding the region to be operated upon. It will further be noted, that in the event that only one consecutive blank row and column is required to bound the region, that in such event the region would be limited to area 94 and would not include area 120. Accordingly, in situations involving a non-contiguous area, the user may alter conditions defining the region to expand or contract the boundaries of the region accordingly. Similarly, it is possible for the user to alter the conditions such that the region includes areas 94, 120 as well as area 135. However, in the presently preferred embodiment the areas illustrated in FIG. 4 would comprise two regions; the first including areas 94 and 120 bounded by rectangle 130, and the second comprising area 135. A user placing cursor 90 within area 94 would result in computer 20 interpreting a command using the word "THIS" to the region bounded by rectangle 130.

Figure 5:
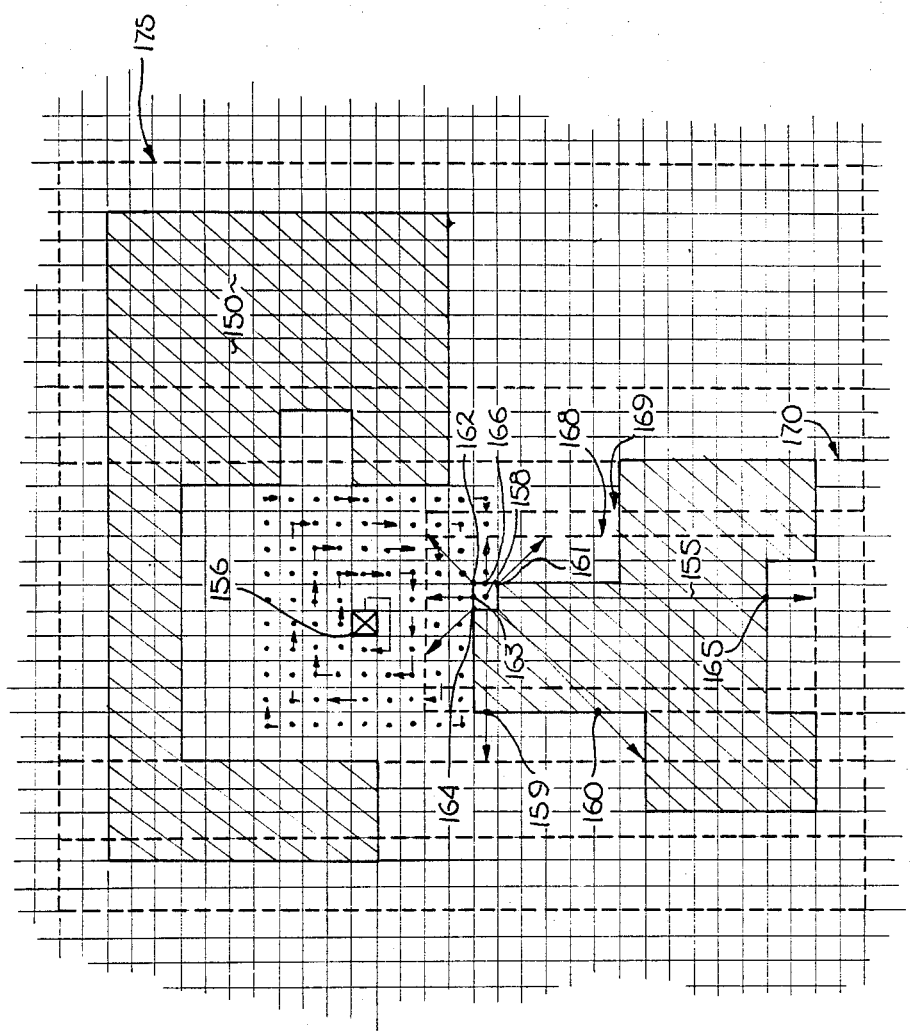
FIG. 5 illustrates the spiraling action of the present invention to define region boundaries in the case of a non-contiguous shape.

Referring now to FIG. 5, the operation of the present invention is illustrated in a situation in which two non-contiguous areas 150 and 155 are displayed on CRT 36, and wherein a cursor 156 is placed by a user over a blank (disabled) display element. With reference to FIGS. 1, 2 and 5, CPU 24 determines that cursor 156 is disposed over a blank (disabled) element. Accordingly, the cell corresponding to cell 156 is not used as a seed cell, but rather, CPU 24 increments the initial X, Y address of cursor 156 to search outwardly, a predetermined maximum distance, in a spiral fashion to adjacent cells as shown in FIG. 5. As the search of CPU 24 spirals outward from cursor 156, the first non-blank (enabled) cell located is cell 158 which is set as the new seed cell. CPU 24 then, as previously discussed with reference to FIGS. 3b and 4, searches radially in eight directions to identify boundary cells 159 through 166. In the presently preferred embodiment, a failure of CPU 24 to locate a non-blank cell within the predetermined maximum distance results in the "region" being defined as the original seed cell.

Pursuant to the convention of the presently preferred embodiment, boundary cells 164 and 161 are used to define an initial rectangular region, which, in the present example, simply comprises the cell 158. Inasmuch as cell 158 is not bounded by two consecutive blank rows and columns, CPU 24 selectively, and incrementally, expands the initial rectangular region into rectangles 168, 169 and 170. The expansion of the bounding rectangular region to that defined by rectangle 170 (in phantom lines) results in the detection of area 150 within two consecutive columns of blank cells from area 155. Accordingly, as set forth in the sequence of operations of FIG. 2 and described above, CPU 24 incorporates area 150 into the region and expands the boundary rectangles accordingly until the entire region is bounded by rectangle 175.

It will be appreciated by one skilled in the art, that although the Figures illustrate the boundaries of a region as being defined by a phantom rectangular line, the rectangular phantom line is for illustration only, and the region is for purposes of CPU 24 defined as all cells disposed within the bounding rectangle. It will further be noted that although cursor 156 was disposed between areas in the example of FIG. 5, that the boundaries of rectangle 175 would also result by placement of cursor 156 in either area 155 or area 150.

The present invention will now be described with reference to its application for its use in a "spread sheet" environment. As illustrated in FIG. 6, a typical spread sheet includes a plurality of identified columns (A, B, C ..., etc.), as well as a plurality of rows numbered 41 through 59 in the example illustrated in FIG. 6. The intersection of the rows and columns in the present example comprise display cells which are identified by their location in the matrix. It will be appreciated that in the example of FIG. 6, each display cell (for example, cell (B,44)) is comprised of a plurality of display elements on CRT 36. As will be described, the present invention may be efficiently used in a spread sheet environment by operating on the display cells in the same manner as display elements (and memory cells) were operated upon in the examples of FIGS. 3b, 4 and 5, above.

As illustrated in FIG. 6, a cursor (identified as solid rectangle) 200 is disposed over cell (B,55). In determining the boundaries of the region on the spread sheet illustrated, CPU 24 executes the operations set forth in FIG. 2, and, since cell (B,55) is non-blank (enabled) the CPU proceeds immediately with its eight direction radial search previously described above. The radial search results in the identification of boundary cells, identified for convenience by points 201 through 208. It will be appreciated that the boundary cells are identified for illustration purposes only as points 201 through 208. However, the identification of the location of these points is that of the respective cell (for example, boundary point 205 as illustrated has coordinates (B,59)). Upon identifying the radial boundary points, CPU 24, in accordance with the present embodiment, identifies points 201 and 206 (namely cells (B,55) and (C,59) and defines an initial rectangular region 210, identified by phantom lines through these cells. The CPU then determines that although two blank rows exist in the positive and negative Y directions from the initial rectangles boundaries, that two blank columns do not exist in the plus X direction from the boundaries of the initial rectangle. Accordingly, CPU selectively extends the boundaries of the initial rectangle until the condition of two blank rows and columns exist around the defined rectangle. The region, therefore, is defined by the coordinates (B,55), (G,55), (B,59), (G,59). It will further be noted that in those instances where two fully blank rows or columns do not exist but CPU 24 detects the physical borders of the work sheet (or display screen/bit map) that the condition of two fully blank rows or columns is met. For example, in FIG. 6, CPU 24 detected a fully blank column A and the borders of the work sheet, and accordingly, the condition of two fully blank columns was satisfied.

Referring now to FIG. 7, a spread sheet is illustrated which includes two separate groups of entries separated by two columns (columns D and E). To illustrate the operation of the present invention under such conditions, assume for sake of example that a user places cursor 220 over cell (B,88). Since cell (B,88) is non-blank, CPU 24 proceeds to radially search outward in eight directions for consecutive blank rows and columns, and identifies boundary cells identified by points in FIG. 7. The initial rectangle, using the convention of the present invention, is defined through points 222 and 226, as illustrated and shown in phantom lines as rectangle 230. CPU 24 then expands the initial rectangles boundaries until the condition of two two blank columns and rows surrounding the seed cell (namely cell (B,88)) is satisfied. It will be appreciated that CPU 24 when searching in the negative X direction will reach the border of the worksheet, and that since columns D and E are blank that the data disposed in columns F and G will not form part of the defined region. Accordingly, the bounding rectangle identified by the numeral 235 in FIG. 7 is defined, wherein the data disposed within the defined region has the coordinates of cells (B,84), (C,84), (C,89) and (B,89). Just as in the case of arbitrary regions defined on a display screen discussed with reference to FIGS. 3, 4, and 5, the application of the present invention to a spread sheet environment permits the user to alter the variables used in determining the boundaries of spread sheet regions by CPU 24. For example, the constraint of two blank columns surrounding the region could be altered by the user such that only one blank column bounds the region. Similarly, the number of rows bounding the region maybe selectively varied to accomplish the desired result in defining regions.

Referring now to FIG. 8, assume for sake of example that cursor 250 is positioned over cell (F,108). In order to determine the boundaries of the region being operated upon, CPU 24 proceeds to search radially in eight directions to identify the bounding cells as previously described. An initial rectangular region is defined through the upper left and lower right cells resulting in initial rectangle 260. The boundaries of this initial rectangle are extended such that the two blank columns and two blank row rule is satisfied, resulting in bounding rectangle 262. CPU 24 may then proceed with the execution of the context oriented command on data disposed within the region of the bounding rectangle 262.

Figure 9:
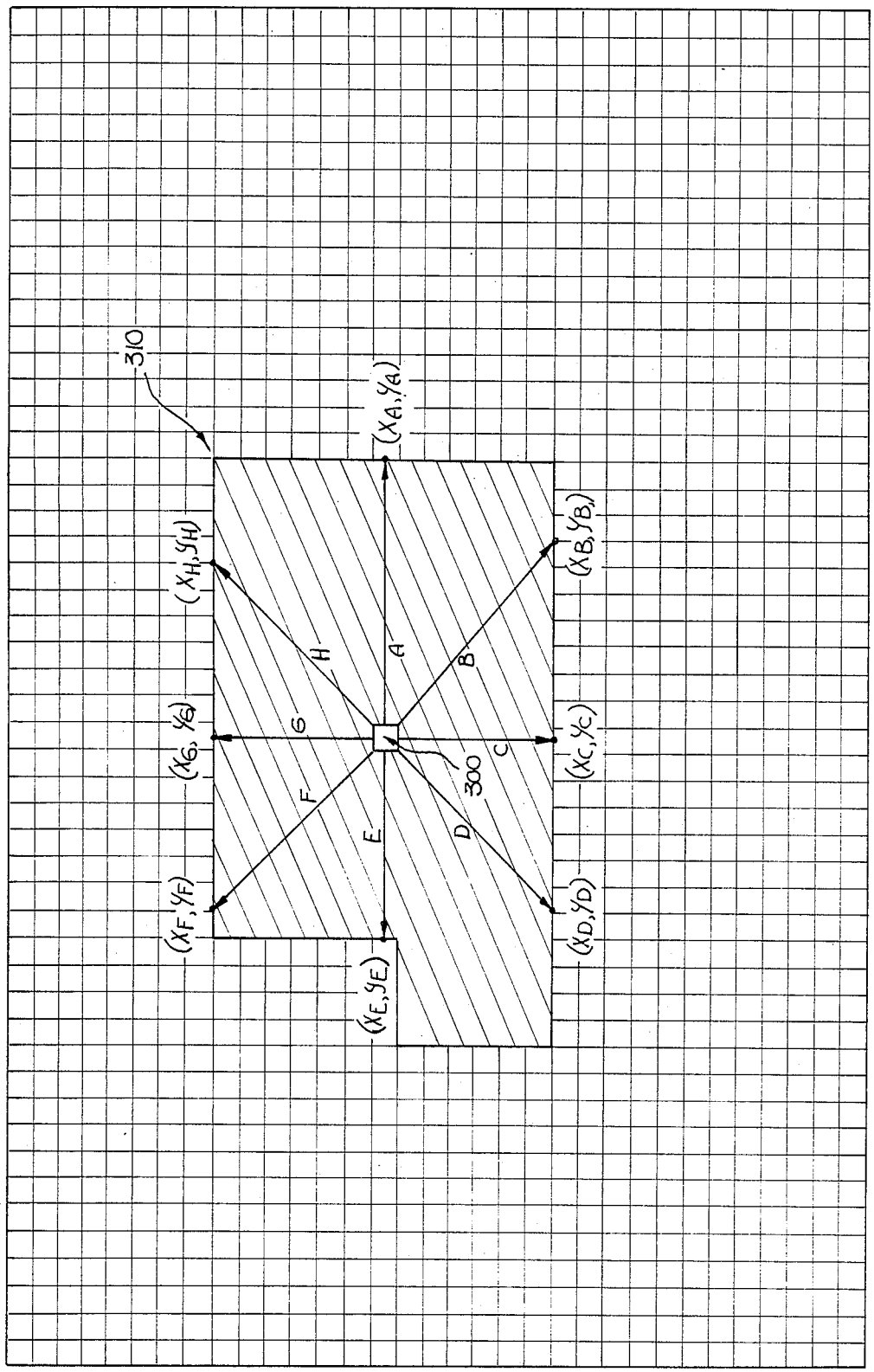
FIG. 9 illustrates an alternate embodiment of the invention for increasing efficiency in defining an initial rectangle.

An alternate embodiment of the present invention is disclosed, in which the initial rectangle is defined through two points having maximum and minimum values, respectively of the boundary cells. Referring now to FIG. 9, a cursor 300 is disposed within an area 310 over an enabled cell. As previously described, CPU 24 searches radially outward (up to a predetermined maximum distance) from the seed cell (cursor 300) in eight directions identified by the letters A, B, C, D, E, F, G, and H, respectively. Boundary points are then located by CPU 24 having X, Y coordinates, as illustrated in the Figure. It will be recalled from the discussion relative to FIGS. 1 through 8, above, that in the primary embodiment, the initial rectangle was defined through the upper left and lower right boundary points. However, it has been found that greater efficiency may be realized by defining the initial rectangle through two points having the following coordinates:

Minimum Point ($X_{MIN}$, $Y_{MIN}$):
 Where
  $X_{MIN}$=MIN ($X_{300}$, $X_D$, $X_E$, $X_F$)
  $Y_{MIN}$=MIN ($Y_{300}$, $Y_F$, $Y_G$, $Y_H$)

Maximum Point ($X_{MAX}$, $Y_{MAX}$):
 Where
  $X_{MAX}$=MAX ($X_{300}$, $X_H$, $X_A$, $X_B$)
  $Y_{MAX}$=MAX ($Y_{300}$, $Y_B$, $Y_C$, $Y_D$)

In accordance with the above expressions, each minimum and maximum value is determined and the initial rectangle is then defined therethrough. The notation MAX ($X_{300}$, $X_H$, $X_A$, $X_B$) indicates that the maximum X value of all X values within the parenthesis is used. The value $X_{300}$ indicates the X value of the seed cell, identified by cursor 300. Once the initial rectangle is defined, the present invention executes the sequence of operations described with respect to FIGS. 1 through 8 to determine the boundary rectangle of area 310.

Accordingly, the present invention has been disclosed which provides apparatus and methods whereby the boundaries of any arbitrarily shaped region may be defined. Although the present invention has been described with reference to FIGS. 1 through 8, it will be appreciated that the Figures are for illustration only, and do not limit the spirit and scope of the invention.

We claim:

1. A computer display system having a central processing unit (CPU) coupled to display means including a display, said display having a plurality of selectively enabled and disabled display elements arranged in a matrix, such that each display element is identified by a unique X, Y address, comprising:
  memory means coupled to said CPU for storing a plurality of binary quantities, each of said binary quantities disposed in a memory cell corresponding to a display element, said binary quantities defining regions on said display;
  cursor control means coupled to said CPU for selecting an initial X, Y address on said display, and corresponding memory cell in said memory means, to identify an area on said display where the boundaries of a region are to be determined, said initial cell being defined as a seed cell;
  logic means coupled to said CPU for determining if said initial X, Y address corresponds to a disabled memory cell, and in such event said logic means incrementing said initial X, Y address to search outwardly to adjacent memory cells until an enabled cell is located, said enabled cell then being defined as the new seed cell;
  said CPU searching radially outward in M directions from the X, Y address of said seed cell for N consecutive disabled memory cells, and said logic means setting in each of said directions, the last enabled memory cell prior to said N consecutive disabled cells, as boundary cells;
  said logic means defining an initial rectangular region through at least two of said boundary cells; said logic means determining if P consecutive rows and columns of disabled memory cells bound said initial rectangular region, said CPU selectively extending the boundaries of said initial region in X and Y directions until said region is bounded by P consecutive rows and columns of disabled cells;
  whereby the boundaries of a region on said display are determined.

2. The computer display system as defined by claim 1, further including input means coupled to said CPU for inputting into said memory means data representative of at least one region comprising a plurality of binary quantities.

3. The computer display systems as defined by claim 2, wherein said logic means searches outwardly by spiraling said search from said seed cell.

4. The computer display system as defined by claim 3, wherein M is equal to eight (8) directions extending radially from said seed cell.

5. The computer display system as defined by claim 4, wherein said initial rectangular region is defined through the uppermost left and lowermost right boundary cells.

6. The computer display system as defined by claim 5, wherein N is equal to two (2) disabled memory cells.

7. The computer display system as defined by claim 6, wherein P is equal to two (2) consecutive rows and columns of disabled cells.

8. The computer display system as defined by claim 7, wherein input means comprises a keyboard.

9. A method for determining the boundaries of a region on a computer controlled display system, said display system including a central processing unit (CPU) coupled to a display, said display having a plurality of selectively enabled and disabled display elements arranged in a matrix, such that each display element is identified by a unique X, Y address, comprising the steps of:
  providing memory means coupled to said CPU for storing a plurality of binary quantities, each of said binary quantities disposed in a memory cell corresponding to a display element, said binary quantities defining regions on said display;
  positioning a cursor using cursor control means coupled to said CPU for selecting an initial X, Y address on said display, and corresponding memory cell in said memory means, to identify an area on said display where the boundaries of a region are to be determined, said initial cell defined as a seed cell;
  determining if said initial X, Y address corresponds to a disabled memory cell, and if so, incrementing said initial X, Y address to search outwardly to adjacent memory cells until an enabled cell is located and setting said located enabled cell as the new seed cell;
  searching radially outward in M directions from the X, Y address of said seed cell for N consecutive disabled memory cells, and setting, for each of said directions, the last enabled memory cell prior to said N consecutive disabled cells as boundary cells;
  defining an initial rectangular region through at least two of said boundary cells;
  determining if P consecutive rows and columns of disabled memory cells bound said initial rectangular region, and selectively extending the boundaries of said initial regions in X and Y directions until said region is bounded by P consecutive rows and columns of disabled cells;
  whereby the boundaries of a region on said display are determined.

10. The method as defined by claim 9, further including the step of inputting at least one region comprising a plurality of binary quantities into said memory means.

11. The method as defined by claim 10, wherein said step of searching outwardly for an enabled memory cell comprises the step of:
  searching all immediately adjacent memory cells to said seed cell by spiraling said search from said seed cell.

12. The method as defined by claim 11, wherein M is equal to eight (8) directions extending radially from said seed cell.

13. The method as defined by claim 12, wherein said initial rectangular region is defined through the uppermost left and lowermost right boundary cells.

14. The method as defined by claim 13, wherein N is equal to two (2) consecutive disabled memory cells.

15. The method as defined by claim 14, wherein P is equal to two (2) consecutive rows and columns of disabled cells.

16. A method for determining the boundaries of a region on a computer display, said display having a plurality of display cells identified by X, Y addresses on said display, each of said cells being selectively filled with data or left blank, comprising the steps of:
  providing memory means coupled to a central processing unit (CPU) and said display, for storing data for display in a memory cell corresponding to a display cell, said data defining regions on said display;
  positioning a cursor using cursor control means coupled to said CPU for selecting an initial display cell on said display, and corresponding memory cell in said memory means, to identify an area on said display where the boundaries of a region are to be determined, said initial display cell defined as a seed cell;
  determining if said initial seed cell corresponds to a blank display cell and memory cell, and if so, incrementing said initial X, Y address to search outwardly to adjacent cells until a filled cell is located, and setting said located filled cell as the new seed cell;
  searching radially outward in M directions from the X, Y address of said seed cell for N consecutive blank cells, and setting, for each of said directions, the last filled cell prior to said N consecutive empty cells as boundary cells;
  defining an initial rectangular region through at least two of said boundary cells;
  determining if P consecutive rows and columns of empty cells bound said initial rectangular region, and selectively extending the boundaries of said initial region in X and Y directions until said region is bounded by P consecutive rows and columns of empty cells;
  whereby the boundaries of a region on said display are determined.

17. The method as defined by claim 16, further including the step of inputting data comprising at least one region into said memory means.

18. The method as defined by claim 17, wherein said step of searching outwardly for an filled memory cell comprises the step of:
  searching all immediately adjacent memory cells to said seed cell by spiraling said search from said seed cell.

19. The method as defined by claim 18, wherein M is equal to eight (8) directions extending radially from said seed cell.

20. The method as defined by claim 19, wherein said initial rectangular region is defined through the uppermost left and lowermost right boundary cells.

21. The method as defined by claim 20, wherein N is equal to two (2) consecutive disabled memory cells.

22. The method as defined by claim 21, wherein P is equal to two (2) consecutive rows and columns of disabled cells.

23. A computer display system having a central processing unit (CPU) coupled to display means including a display, said display having a plurality of display cells identified by X,Y addresses on said display, each of said cells being selectively filled with data or left blank, comprising:
  memory means coupled to said CPU for storing data for display in a memory cell corresponding to a display cell, said data defining regions on said display;
  cursor control means coupled to said CPU for selecting an initial display cell on said display, and corresponding memory cell in said memory means, to identify an area on said display where the boundaries of a region are to be determined, said initial display cell defined as a seed cell;
  said CPU determining if said initial seed cell corresponds to a blank display cell and memory cell, and if so, incrementing said initial X,Y address to search outwardly to adjacent cells until a filled cell is located, and setting said located filled cell as the new seed cell;
  said CPU searching radially outward in M directions from the X,Y address of said seed cell for N consecutive blank cells, and setting, for each of said directions, the last filled cell prior to said N consecutive empty cells as boundary cells;
  said CPU defining an initial rectangular region through at least two of said boundary cells, and determining if P consecutive rows and columns of empty cells bound said initial rectangular region, and selectively extending the boundaries of said initial region in X and Y directions until said region is bounded by P consecutive rows and columns of empty cells;
  whereby the boundaries of a region on a display are determined.

24. The computer display system as defined by claim 23, further including input means coupled to said CPU for inputting into said memory means data representative of at least one region comprising a plurality of binary quantities.

25. The computer display systems as defined by claim 24, wherein said logic means searches outwardly by spiraling said search from said seed cell.

26. The computer display system as defined by claim 25, wherein M is equal to eight (8) directions extending radially from said seed cell.

27. The computer display system as defined by claim 26, wherein said initial rectangular region is defined through the uppermost left and lowermost right boundary cells.

28. The computer display system as defined by claim 27, wherein N is equal to two (2) disabled memory cells.

29. A computer display system having a central processing unit (CPU) coupled to display means including a display, said display having a plurality of selectively enabled and disabled display elements arranged in a matrix, such that each display element is identified by a unique X, Y address, comprising:

memory means coupled to said CPU for storing a plurality of binary quantities, each of said binary quantities disposed in a memory cell corresponding to a display element, said binary quantities defining regions on said display;

cursor control means coupled to said CPU for selecting an initial X, Y address on said display, and corresponding memory cell in said memory means, to identify an area on said display where the boundaries of a region are to be determined, said initial cell being defined as a seed cell;

logic means coupled to said CPU for determining if said initial X,Y address corresponds to a disabled memory cell, and in such event said logic means incrementing said initial X, Y address to search outwardly a pre-determined maximum distance to adjacent memory cells until an enabled cell is located, said enabled cell then being defined as the new seed cell;

said CPU searching radially outward in M directions from the X, Y address of said seed cell for N consecutive disabled memory cells, and said logic means setting in each of said directions, the last enabled memory cell prior to said N consecutive disabled cells, as boundary cells;

said logic means determining the maximum and minimum values of X, Y coordinates of said boundary cells and said seed cell, and defining maximum ($X_{MAX}$, $Y_{MIN}$) and minimum ($X_{MIN}$, $Y_{MIN}$) initial points from said maximum and minimum values, respectively;

said logic means defining an initial rectangular region through said maximum and minimum points; said logic means determining if P consecutive rows and columns of disabled memory cells bound said initial rectangular region, said CPU selectively extending the boundaries of said initial region in X and Y directions until said region is bounded by P consecutive rows and columns of disabled cells;

whereby the boundaries of a region on said display are determined.

30. The computer display system as defined by claim 29, wherein M is equal to 8, and radial vectors are defined from said seed cell X, Y coordinate ($X_s Y_s$) to each of said boundary cells, said vectors being numbered A through H clockwise, beginning from the positive X axis.

31. The computer display systems as defined by claim 30, wherein said initial maximum and minimum points are defined by the following expression:

Maximum Point ($X_{MAX}$, $Y_{MAX}$):
Where
$X_{MAX} = MAX(X_S, X_H, X_A, X_B)$
$Y_{MAX} = MAX(Y_S, Y_B, Y_C, Y_D)$ Minimum Point ($X_{MIN}$, $Y_{MIN}$):
Where
$X_{MIN} = MIN(X_S, X_D, X_E, X_F)$
$Y_{MIN} = MIN(Y_S, Y_F, Y_G, Y_H)$ 32. A method for determining the boundaries of a region on a computer controlled display system, said display system including a central processing unit (CPU) coupled to a display, said display having a plurality of selectively enabled and disabled display elements arranged in a matrix, such that each display element is identified by a unique X, Y address, comprising the steps of:

providing memory means coupled to said CPU for storing a plurality of binary quantities, each of said binary quantities disposed in a memory cell corresponding to a display element, said binary quantities defining regions on said display;

positioning a cursor using cursor control means coupled to said CPU for selecting an initial X, Y address on said display, and corresponding memory cell in said memory means, to identify an area on said display where the boundaries of a region are to be determined, said initial cell defined as a seed cell;

determining if said initial X, Y address corresponds to a disabled memory cell, and if so, incrementing said initial X, Y address to search outwardly a predetermined maximum distance to adjacent memory cells until an enabled cell is located and setting said located enabled cell as the new seed cell;

searching radially outward in M directions from the X, Y address of said seed cell for N consecutive disabled memory cells, and setting, for each of said directions, the last enabled memory cell prior to said N consecutive disabled cells as boundary cells;

defining maximum ($X_{MAX}$, $Y_{MAX}$) and minimum ($X_{MIN}$, $Y_{MIN}$) initial points from the maximum and minimum X, Y values of said boundary cells and said seed cell, respectively;

defining an initial rectangular region through said initial maximum and minimum points;

determining if P consecutive rows and columns of disabled memory cells bound said initial rectangular region, and selectively extending the boundaries of said initial regions in X and Y directions until said region is bounded by P consecutive rows and columns of disabled cells;

whereby the boundaries of a region on said display are determined.

33. The method as defined by claim 32, further including the stop of inputting at least one region comprising a plurality of binary quantities into said memory means.

34. The method as defined by claim 33, wherein M is equal to 8, and radial vectors are defined from said seed cell X, Y coordinate ($X_s Y_s$) to each of said boundary cells, said vectors being numbered A through H clockwise, beginning from the positive X axis.

35. The computer display systems as defined by claim 34, wherein said initial maximum and minimum points are defined by the following expression:

Maximum Point ($X_{MAX}$, $Y_{MAX}$):
Where
$X_{MAX} = MAX(X_S, X_H, X_A, X_B)$
$Y_{MAX} = MAX(Y_S, Y_B, Y_C, Y_D)$ Minimum Point ($X_{MIN}$, $Y_{MIN}$):
Where
$X_{MIN} = MIN(X_S, X_D, X_E, X_F)$
$Y_{MIN} = MIN(Y_S, Y_F, Y_G, Y_H)$.

* * * * *